Figure 1:
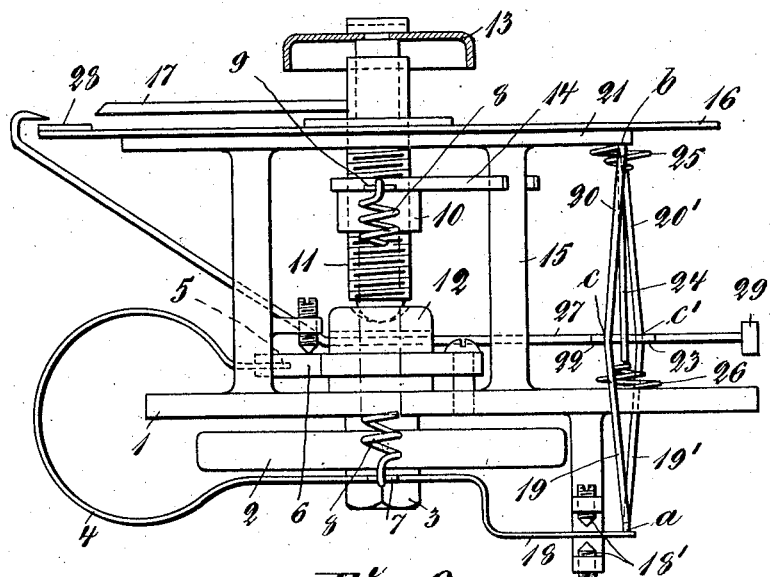

June 3, 1930.   J. G. PAULIN   1,761,489
INSTRUMENT FOR MEASURING VARIABLE FORCES
Filed Nov. 10, 1927   2 Sheets-Sheet 1

J. G. Paulin
INVENTOR

By: Marks & Clerk
ATTYS.

June 3, 1930.  J. G. PAULIN  1,761,489
INSTRUMENT FOR MEASURING VARIABLE FORCES
Filed Nov. 10, 1927   2 Sheets-Sheet 2

J. G. Paulin
INVENTOR

By: Marks & Clerk
ATTYS.

Patented June 3, 1930

1,761,489

UNITED STATES PATENT OFFICE

JOSUA GABRIEL PAULIN, OF STOCKHOLM, SWEDEN

INSTRUMENT FOR MEASURING VARIABLE FORCES

Application filed November 10, 1927, Serial No. 232,430, and in Sweden November 22, 1926.

The present invention refers to such instruments for measuring of variable forces, in which the movable measuring member arranged under the influence of said forces is connected with the pointer through an elastic expansible system of flexible members in the form of bands or strips or the like, said flexible members forming a gearing device operating frictionless and without play for the transmission of the movements of the measuring member to the pointer on an enlarged scale.

Amongst other objects, the invention aims at providing an increased sensibility of the instrument, and is primarily adapted to be carried into effect in connection with such instruments of the type in question where the movable measuring member is arranged under the influence of the variable forces to be measured on the one hand and a counteracting spring system on the other hand, the tension of the latter being variable by means of a zeroizing device for the purpose of reading off the instrument according to the zero method.

Such instruments, arranged for reading according to the zero method, in which a gearing device consisting of flexible bands or strips is provided between the measuring member, for instance the diaphragm of a barometer, on the one hand and a readily movable pointer on the other hand, are extremely suitable for precision measurements, particularly when, in addition, the journal bearing of the pointer is replaced by an elastic suspension means which likewise may be adapted to operate frictionless and without play. In an instrument devised in this manner, the faults of measurement may be reduced to a minimum value, inasmuch as the friction as well as the unavoidable loose engagement or play of cooperating movable parts are practically dispensed with in the arrangement as a whole.

Precision instruments of this class have in later times been devised mainly for accurate measurements of atmospheric pressure in connection with measurements of altitudes and in aeronautics. For meteorological purposes this type of barometer has also become of great importance. Hitherto, however, the manufacture of an instrument with a pointer of sufficient length, while maintaining a form adapted for a transportable instrument, was connected with practical difficulties. In connection with the band systems for the transmission of movements as hitherto known, the axis of rotation of the pointer was always arranged at right angles to the vertical axis of the instrument, the pointer then assuming a substantially vertical position, and the instrument, accordingly, if provided with a pointer of great length, would be of great height as compared with the diameter thereof.

According to the present invention, the movements of the measuring member are transmitted, through the medium of an elastic and yieldable system of bands or strings, onto a pointer the axis of rotation of which is arranged in parallel to the direction of expansion of the band system. As in a barometer the measuring member is, for practical reasons, arranged in such a maner that the movements thereof take place in the direction of the vertical axis of the instrument and, accordingly, the direction of expansion of the elastic band system is also vertical, the pointer according to the invention will be swingable in a horizontal or substantially horizontal plane. Thus it will be possible to make the pointer of great length, without increasing the height of the instrument in a corresponding degree.

In connection with the arrangement of the axis of rotation in parallel to the direction of expansion of the band system, a particularly great ratio of gear in the band system may in addition be obtained, as will be found from the following description. Moreover, an arrangement of the pointer capable of extraordinary easy movement may be provided in this case.

The invention can also be advantageously utilized in precision instruments other than barometers.

Figure 2:
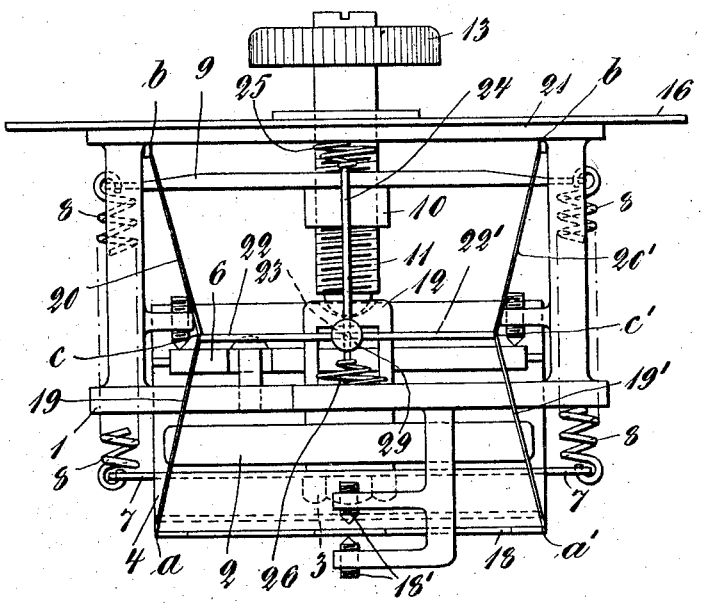
Figure 3:
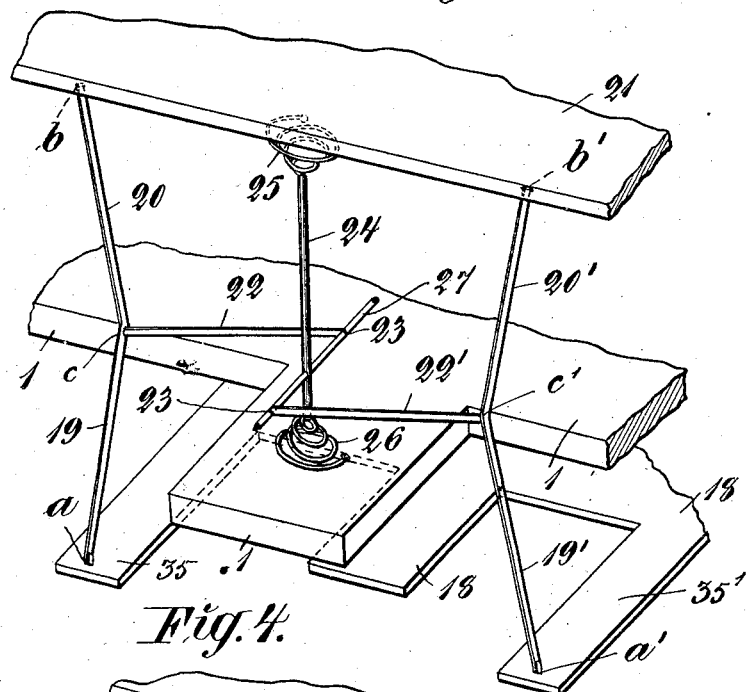
Figure 4:
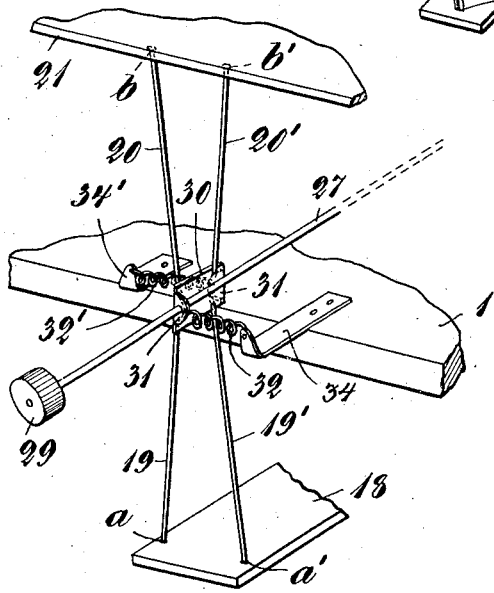

The invention will be described more closely with reference to the accompanying drawings. These drawings represent two different embodiments of a precision barometer, in which the gas pressure acting on a diaphragm is counteracted by a resilient force the total tension of which may be regulated by a zeroizing device. Figures 1 and 2 show a lateral view and a front view respectively of the instrument according to the first embodiment thereof. Figure 3 is a perspective view of the band system of this embodiment. Figure 4 is a perspective view of the band system and the pointer of the second embodiment of the instrument.

The measuring member arranged under the influence of the external gas pressure comprises a diaphragm box 2 attached to the lower side of a base plate 1. Against the downwardly directed diaphragm of the diaphragm box, the one shank of a yoke-shaped leaf-spring 4 is secured by means of a nut 3, the upper shank of said leaf-spring being clamped along its front edge in a slot 5 of a bar 6 extending transversely over the base plate. The position of this bar may be altered within certain limits by means of set screws, whereby the tension of the leaf-spring may be suitably regulated.

On both sides of the nut 3, the leaf-spring is provided with laterally projecting laps 7 to which the lower ends of two helical springs 8 are attached, the upper ends of these springs being secured to a yoke 9, which is connected with a nut 10, the latter being screwed onto a micrometer screw 11 and adapted to be adjusted in the vertical direction by rotation of said screw. The micrometer screw is journalled at its lower end in a journal bearing 12 and is provided at the top with a knob 13. The nut 10 is provided with a forwardly projecting arm 14, the outer end of which is forked and adapted to embrace a post 15 of the frame, said post serving as a guide, so that the nut will be raised or lowered on rotation of the micrometer screw without taking part in the rotary movement, whereby the tension of the springs 8 will be increased or decreased respectively. The parts 10—14 together form a zeroizing device, by means of which the diaphragm may be restored into a certain normal position with the aid of the deflection of a zero pointer connected with the diaphragm. The zeroizing device, the position of which may be read off by means of a fixed scale 16 and a pointer 17 connected with the micrometer screw, only controls the tension of the comparatively weak springs 8, whereas the tension of the leaf-spring 4 is independent of the zeroizing device.

In the embodiment described, the springs 8 adapted to be adjusted by means of the zeroizing device obviously counteract the leaf-spring 4, and thus the tension of the latter should be greater than the total atmospheric pressure acting on the diaphragm. The arrangement could of course be devised reversely in such a manner that the adjustable springs 8 act in the same direction as the constant leaf-spring, the tension of which should then be smaller than the total atmospheric pressure acting on the diaphragm.

The lower shank of the leaf-spring 4 is provided with a forwardly projecting extension 18, the front end of which is playing between two adjustable stop screws 18′ adapted to limit the movements of the diaphragm.

The gearing device connecting the diaphragm and the zero pointer comprises two pairs of flexible bands 19, 20 and 19′, 20′, respectively. Each pair forms a connection bent to an obtuse angle between an extension 35 or 35′ respectively of the leaf-spring 4 on the one hand and an upper fixed plate 21 in the frame on the other hand, said plate serving at the same time as a carrier of the scale 16. The points of attachment $a$, $a'$ of the band system at the extensions 35, 35′ and the points of attachment $b$, $b'$ in the frame are all situated in a plane extending at right angles to the plane of symmetry of the instrument. The apexes $c$, $c'$ of the two angularly bent band connections 19, 20 and 19′, 20′, respectively are connected through bands 22, 22′ respectively with the ends 23 of a short transversal pin secured to a vertical pointer spindle 24, the ends of which latter are connected with the free ends of two helical springs 25, 26 attached to the frame and arranged coaxially with the pointer spindle. Said springs form an elastic suspension means for the pointer spindle which, owing to this elastic suspension, is capable of rotating frictionless and without play. The spindle 24 in turn carries the zeroizing pointer 27 which is soldered at right angles to the spindle 24, suitably forming extensions of the transversal pin 23—23, and which, consequently, is swingable substantially in a horizontal plane. As will be seen from Figure 3, the two angularly bent band connections 19, 20 and 19′, 20′, are situated each in one of two parallel planes $a$, $b$, $c$ and $a'$, $b'$, $c'$ respectively, which, on each alteration of the distance between the movable points $a$, $a'$ on the one hand and the fixed points $b$, $b'$ on the other hand, will turn about the axes $a\ b$ and $a'\ b'$ respectively by reason of the connection of the apexes $c$, $c'$ with the transversal pin 23—23.

The zero pointer 27 extends through a recess in the journal bearing 12 of the micrometer screw. The rear end of the pointer is bent upwards and around the edge of the circular plate carrying the scale 16, said circular plate carrying in addition a short scale 28 in front of the point of the zero pointer 27, which is adapted to play over said scale 28. At its opposite end the zero pointer carries a counter weight 29.

When the tension of the helical springs 8 is regulated so that the resultant of the spring forces acting on the diaphragm exactly balances the air pressure, the zero pointer 27 is located in its middle position and points at the zero line of the zero scale 28. Now, if the atmospheric pressure decreases, the diaphragm will be bent somewhat downwardly by reason of the excess tension of the leaf-spring 4, the band system then expanding and the obtuse angles $a\ b\ c$ and $a'\ b'\ c'$ becoming somewhat more more obtuse, their planes approaching the plane $a\ a'\ b\ b'$, and the zero pointer being deflected. If, on reading off the instrument, the diaphragm is to be restored into its zero position, the zeroizing knob is to be turned in a clockwise direction so far that the zero pointer is again caused to point at zero. Through this rotary movement the nut 10 and the yoke 9 are raised, whereby the tension of the helical springs 8 is increased, the resultant of the spring tensions acting on the diaphragm being thus reduced into agreement with the reduced air pressure. On an increase of the air pressure, compensation is brought about in the reversed order by turning the zeroizing knob 13 in a counter-clockwise direction, the tension of the helical springs 8 being thus reduced, while the total spring tension on the diaphragm is increased.

The total turning of the knob 13 at the moment when the zero pointer 27 is adjusted at zero, represents a measure of the air pressure prevailing at this moment, which air pressure is also indicated by the pointer 17 on the scale 16 pertaining thereto.

In the embodiment according to Figure 4 the parts not shown may be devised for instance in accordance with Figures 1 and 2. In this embodiment the band system serving as amplifying gearing device consists, as a whole, of the two angularly bent band connections 19, 20 and 19', 20' respectively, the apexes $c, c'$ being in this case connected to the rotatable pointer system direct, that is to say without the agency of flexible intermediate connections (22, 22' in Figures 1 to 3).

The two lower bands 19, 19' are attached with their lower ends to the extension 18 of the lower shank of the leaf-spring 4, as at $a$ and $a'$ respectively, whereas the upper ends of the same are connected to the lower edge of a thin rectangular sheet-metal plate 30, which latter is carried by the upper bands 20, 20' attached to the fixed plate 21, as at $b$ and $b'$ respectively. The two ends of the plate 30 are bent at right angles to opposite sides and form laps 31. Attached to these laps are the inner ends of two helical springs 32 and 32' respectively, whereas the outer ends of the springs are secured to sheet-metal strips 34 and 34' respectively, which strips are screwed fast to the base plate 1. The tensions of the springs 32, 32' are so selected that the plate 30 will normally, that is to say, when the diaphragm occupies its middle position, be at right angle to the plane $a\ a'\ b\ b'$, the plane of the plate then coinciding with the central plane of the instrument. The band system is, accordingly, subjected to torsion to some extent inasmuch as the planes of the two angularly bent band connections 19, 20 and 19', 20' respectively are turned out of the plane of the four points of attachment $a, a', b, b'$. The two apexes $c, c'$ situated approximately on the central line of the plate 30 at the ends thereof, are obviously located each on one side of the plane $a\ a'\ b\ b'$.

The zero pointer 27 is soldered fast along the central line of the plate 30. Otherwise, the same is arranged in a similar manner as the corresponding pointer in Figures 1, 2. As will be seen, the pointer 27 in the embodiment according to Figure 4 is carried directly as a whole by the band system 19—20'. Thus, the band system itself here forms the elastic suspension means of the pointer in such a manner that the pointer will be capable of swinging without friction about a vertical axis situated in the central plane of the instrument. The elastic resistance against the swinging movements of the pointer about the said axis of rotation may, in addition, be made as small as desired in the present case, inasmuch as the helical springs 32, 32', which have no carrying function, but are only intended to exert the requisite elastic directive power, may be taken comparatively very long and soft. In this respect, the arrangement according to Figure 4 entails a considerable advantage over the arrangement previously described. According to Figures 1, 2 the springs 25, 26 adapted to exert the directive power have the additional function of carrying the whole pointer system, and for this reason the same must be made comparatively strong so as to put up a correspondingly great twisting power against the deflection of the pointer. In connection with the gearing arrangement consisting of the soft flexible bands 19—20', an extreme degree of easy movement is obtained in the whole swingable system. The number of angularly bent band connections or pairs of bands 19, 20 and 19', 20' respectively may be selected at will. The pairs of bands are then preferably arranged symmetrically with respect to the axis of rotation of the pointer.

In both of the described cases the ratio of gear may be increased by increasing the obtuse angles $a\ c\ b$ and $a'\ c'\ b'$ respectively. In the case last described (Figure 4) the ratio of gear may be further increased by decreasing the horizontal distances $a\ a'$ and $b\ b'$ respectively between the points of attachment of the band system. Inasmuch as all frictional resistances are practically dispensed with in the movable systems, there is no objection to selecting the ratio of gear very great so as to increase the sensitivity of the instrument in a corresponding degree.

Through the vertical arrangement of the axis of rotation of the zero pointer, the advantage is obtained, that the height of the instrument will be independent of the pointer length, as stated. The arrangement in question involves the further advantage that the swingable zero pointer system may be balanced by means of a counterweight in such a manner that the position of the readily movable zero pointer will not be influenced by any oblique positions of the instrument. In known meters of altitudes of the kind in question it has been found to be impossible to remove accurately the influence of the weight of the zero pointer upon the adjustment of the latter when the instrument is positioned obliquely. The faults of measurement may become considerable particularly in three main directions of inclination. This fact probably depends on the circumstance that the axis of the zero pointer of the known instruments is situated in a horizontal plane, whereby the counterweight of the pointer is rendered ineffective under certain conditions of inclination. In reading off the instrument, the latter, therefore, must be accurately adjusted in the proper position by means of a water-level. The manipulation thereof will, consequently, be inconvenient and time-wasting.

By the vertical arrangement of the axis of rotation of the pointer according to the present invention, this disadvantage is entirely removed. It has been found that a disturbing influence of smaller deviations from the normal position of an instrument as devised according to the invention in any one of the three main directions and, consequently, in any direction of inclination, may be removed by dimensioning the counterweight in a suitable manner. Moreover, it has been found that the extension of the zero pointer carrying the counterweight 29 must generally be bent somewhat to the side in the plane of oscillation of the pointer, in order to obtain an accurate compensation.

The arrangement according to the invention entails special advantages in regard to the practical construction of the pointer system in a barometer of the type in consideration, where the spring system acting on the diaphragm consists, first, of a leaf-spring of constant tension and, second, of controllable helical springs. The invention may also be advantageously applied to other instruments, for instance to instruments serving for measurement of weights, gas or liquid pressures, electrical forces, currents, tensions, outputs and so forth. The invention can also be utilized in instruments which are not arranged for reading according to the zero method. Otherwise, the eccentric arrangement of the pointer adapted to oscillate substantially in a horizontal plane may be used per se, that is to say, independently of the special type of gearing employed, in barometers or other pressure gauges, in order to obtain an increased length of the pointer.

I claim:

1. An instrument for measuring variable forces comprising in combination, parts displaceable relative to each other under the influence of the forces to be measured, a number of angularly bent flexible members interconnected between said parts, a spring actuated pointer the axis of rotation of which is substantially parallel with the direction of relative motion of said parts, means connecting said pointer with the apexes of said angularly bent members in such a manner as to keep the latter stretched in different planes tangential to a surface of rotation the axis of which coincides with the axis of rotation of the pointer.

2. An instrument as claimed in claim 1, characterized by the fact that the apexes of the angularly bent flexible members are connected with each other and with the pointer through a rigid connection.

3. An instrument as claimed in claim 1, characterized by the fact that the pointer is suspended elastically in such a manner as to be capable of taking part in the movements of the system of flexible members in the direction, in which said system is stretched, that is to say, in parallel to the axis of rotation of the pointer.

4. An instrument for measuring variable forces comprising in combination, parts displaceable relatively to each other under the influence of the forces to be measured, a number of angularly bent flexible members interconnected between said parts, a spring actuated pointer the axis of rotation of which is substantially parallel with the direction of relative motion of said parts, and motion transmitting means connecting the pointer with said flexible members in such a manner as to provide an elastic suspension of the pointer through the medium of said flexible members.

5. An instrument as claimed in claim 4, characterized by the provision of special tension springs adapted to bring about the requisite directive power and serving to strain the system of flexible members, which springs are relieved of the weight of the pointer system and may thus be dimensioned solely with respect to the desired directive action.

6. An instrument as claimed in claim 1, comprising a measuring member movable under the influence of the forces to be measured, characterized by the measuring member being actuated by the one shank of a yoke-shaped leaf-spring attached at the other end in the frame, said spring counteracting the forces to be measured, and the system of flexible members being inserted between the frame and the movable shank of the leaf-spring.

7. In an aneroid barometer with vertical axis in combination, a spring system acting on the diaphragm so as to counteract the influence of the atmospheric pressure, a centrally arranged zeroizing device for regulating the tension of said spring system, a zero pointer the axis of rotation of which is parallel with and eccentrically arranged with respect to the central axis of the zeroizing device, said pointer in its zero position extending diametrically with respect to the instrument, and means connecting the pointer with the diaphragm so as to cause deflexion of the pointer upon variation of the atmospheric pressure.

In testimony whereof I affix my signature.

JOSUA GABRIEL PAULIN.